United States Patent
Gross et al.

(10) Patent No.: US 8,231,715 B2
(45) Date of Patent: Jul. 31, 2012

(54) FILTER ARRANGEMENT FOR CLEANING PROCESS GASES CONTAMINATED WITH PARTICLES AND PROCESS FOR CLEANING FILTER UNITS OF SUCH A FILTER ARRANGEMENT

(75) Inventors: Martin Gross, Steinen (DE); Uwe Schmidt, Schopfheim (DE); Christoph Macho, Steinen (DE); Marcus Knöll, Lörrach (DE)

(73) Assignee: Hüttlin GmbH, Schopfheim (DE)

( * ) Notice: Subject to any disclaimer, the term of this patent is extended or adjusted under 35 U.S.C. 154(b) by 209 days.

(21) Appl. No.: 12/676,032

(22) PCT Filed: Sep. 3, 2008

(86) PCT No.: PCT/EP2008/007170
§ 371 (c)(1), (2), (4) Date: Mar. 2, 2010

(87) PCT Pub. No.: WO2009/030462
PCT Pub. Date: Mar. 12, 2009

(65) Prior Publication Data
US 2010/0212500 A1    Aug. 26, 2010

(30) Foreign Application Priority Data
Sep. 4, 2007 (DE) .......................... 10 2007 041 733

(51) Int. Cl.
*B01D 46/04* (2006.01)
(52) U.S. Cl. ................. 95/281; 96/228; 96/230; 96/233; 55/292; 55/302; 55/482; 55/341.1; 55/380

(58) Field of Classification Search .................... 55/292, 55/294, 302, 328, 341.1–341.7, 380, 393, 55/422, 423, 432, 467, 482, DIG. 27; 95/278–281; 96/228, 230–231, 233, 361, 428
See application file for complete search history.

(56) References Cited

U.S. PATENT DOCUMENTS

| | | | | |
|---|---|---|---|---|
| 3,775,950 A | * | 12/1973 | Hallamore | 96/229 |
| 3,795,089 A | * | 3/1974 | Reither | 96/262 |
| 3,838,524 A | * | 10/1974 | Hencke et al. | 34/365 |
| 3,955,226 A | * | 5/1976 | Feess et al. | 8/149.2 |
| 4,145,194 A | * | 3/1979 | Horlacher et al. | 96/233 |
| 4,155,726 A | * | 5/1979 | Steinmeyer | 96/233 |

(Continued)

FOREIGN PATENT DOCUMENTS

| | | |
|---|---|---|
| DE | 2551117 | 5/1977 |
| DE | 2604493 | 8/1977 |
| DE | 2634965 | 2/1978 |
| DE | 4029994 | 3/1992 |
| DE | WO 02/43835 | 6/2002 |
| DE | 10124526 | 12/2002 |

(Continued)

*Primary Examiner* — Duane Smith
*Assistant Examiner* — Thomas McKenzie
(74) *Attorney, Agent, or Firm* — McGlew and Tuttle, P.C.

(57) ABSTRACT

A filter arrangement, for cleaning gases contaminated with particles, has at least one filter unit with an exterior and an interior filter (3.1, 3.2), wherein the exterior and interior filters can be moved relative to each other, thereby exposing an opening (3.4) in the bottom regions thereof. This allows cleaning of filter units at the site of the filter units without disassembly of the same (cleaning in place—CIP). A method for cleaning is provided in that the region of the filter unit on the clean gas side including introducing a fluid sprayed via a cleaning lance protruding into the clean gas region while exposing a gap (3.4) in the bottom region of the exterior and interior filters.

19 Claims, 7 Drawing Sheets

U.S. PATENT DOCUMENTS

| | | | |
|---|---|---|---|
| 4,222,748 A * | 9/1980 | Argo et al. | 95/64 |
| 4,731,100 A * | 3/1988 | Loeffelmann et al. | 95/281 |
| 4,900,434 A * | 2/1990 | Schade | 210/189 |
| 6,149,716 A * | 11/2000 | Bach et al. | 95/280 |
| 6,228,148 B1 * | 5/2001 | Aaltonen et al. | 95/74 |
| 7,534,278 B2 * | 5/2009 | Consoli et al. | 55/302 |
| 7,922,798 B2 * | 4/2011 | Consoli et al. | 96/229 |
| 2005/0044827 A1 * | 3/2005 | Eppel et al. | 55/423 |
| 2007/0266859 A1 * | 11/2007 | Valenzi | 96/233 |
| 2008/0120949 A1 * | 5/2008 | Welch et al. | 55/341.1 |

FOREIGN PATENT DOCUMENTS

| | | |
|---|---|---|
| JP | 40-024239 | 10/1965 |
| JP | 59-206024 | 11/1984 |
| JP | 05-123516 | 5/1993 |
| JP | 06-262015 | 9/1994 |
| JP | 11-262610 | 9/1999 |
| JP | 2007-061818 | 3/2007 |
| JP | 2007-098254 | 4/2007 |
| WO | WO 01/51172 | 7/2001 |

* cited by examiner

FILTER ARRANGEMENT FOR CLEANING PROCESS GASES CONTAMINATED WITH PARTICLES AND PROCESS FOR CLEANING FILTER UNITS OF SUCH A FILTER ARRANGEMENT

CROSS REFERENCE TO RELATED APPLICATIONS

This application is a United States National Phase application of International Application PCT/EP2008/007170 and claims the benefit of priority under 35 U.S.C. §119 of German patent application DE 10 2007 041 733.2 filed Sep. 4, 2007, the entire contents of which are incorporated herein by reference.

FIELD OF THE INVENTION

The present invention pertains to a filter arrangement for cleaning gases contaminated with particles, with at least one filter unit with an exterior filter and an interior filter as well as to a process for cleaning at least one filter unit with an exterior filter and an interior filter of a filter arrangement, which said interior filter is arranged in said exterior filter.

BACKGROUND OF THE INVENTION

The present invention pertains to a filter arrangement, which is arranged above and on a process container, in which particulate product is treated, e.g., by mixing, drying, granulation, pelletizing and/or coating the product. The process may consist of agglomerating or granulating product particles having the fineness of dust in the process container into larger particles or of providing particulate starting product with a coat by means of coating. A bottom, which is permeable to air and has passages, especially in the form of slots, is usually provided for this in the lower region of the process container.

A filter unit, comprising a cylindrical exterior filter and an interior filter tapering conically from bottom to top, is known from DE 40 29 994 C2.

Air contaminated with particles, such as dusty air, is delivered in the product-treating process operation from the outside through the exterior filter and from the inside through the interior filter into an intermediate space between the exterior filter and the interior filter of the filter unit and via an opened valve to a gas outlet.

To blow off dust collected on the outside of the exterior filter and on the inside of the interior filter, the valve is closed and an air path from a gas inlet for clean gas to the intermediate space between the interior filter and the exterior filter is opened via another valve, so that blowing off of particles adhering to the outside of the exterior filter and to the inside of the interior filter can take place in counterflow. Complete cleaning is not always possible hereby on the side of the filters facing the dusty air, and removal of filter dust having penetrated into the clean air region can be performed with difficulty only. For complete cleaning, the filter unit must be removed and disassembled and the individual filters must then be cleaned one by one. Consequently, cleaning in place (CIP) is not possible in the state of the art without removal of the filter cartridges.

SUMMARY OF THE INVENTION

The basic object of the present invention is therefore to provide a filter arrangement of the type mentioned in the introduction, which and especially the filter units of which can be cleaned completely and comprehensively in place, and to provide a process for carrying out such cleaning.

This object is accomplished according to the present invention in a filter arrangement of the type mentioned in the introduction by the exterior filter and the interior filter being able to be moved in relation to be another, thereby exposing a gap in their lower regions.

For cleaning, the present invention provides for a process of the above-mentioned type, in which provisions are fundamentally made for the region of the filter unit on the clean gas side to be cleaned by means of cleaning fluid sprayed while exposing a gap in the lower regions of the exterior filter and interior filter. This can be carried out especially by means of a cleaning lance protruding into the clean gas region.

Due to the fact that the two individual filters of the filter unit of the filter arrangement according to the present invention, namely, the interior filter and the exterior filter, are not connected rigidly to one another but a gap or slot can be exposed at the site in the lower regions thereof by a relative motion, it is possible, on the one hand, to carry out cleaning, as it is provided for according to the above fundamental process step, by means of (CIP) fluid sprayed into the clean space region between the interior filter and the exterior filter and for the contaminants entrained by said fluid to leave the filter unit through the gap, after which they can be further removed via the process arrangement. Furthermore, it is possible to perform ultrasonic cleaning if the filter unit is equipped with metal filters, for which a liquid coupling medium is necessary between the interior filter and the exterior filter, which can be filled into the intermediate space such that more fluid is fed than can be discharged through the filters themselves, wherein an ultrasound transducer protrudes into the coupling medium to generate the ultrasound in said coupling medium and the coupling fluid can finally flow off again together with contaminants removed from the filters through the gap by opening said gap after the cleaning. Finally, it is possible to carry out a drying of the filters on the inside and outside with the gap opened by drying air flowing in from the slotted disk of the process arrangement.

In a variant, the present invention provides for the exterior filter and the interior filter to be able to be moved relative to one another while exposing an annular gap, wherein especially the interior filter can be lifted off relative to the exterior filter or the interior filter can be lowered relative to the exterior filter. The drive for generating the relative motion between the interior filter and the exterior filter is brought about by a drive means outside the filter unit, for example, via an actuating rod. To fully utilize the possibility of cleaning created by the embodiment of the filter arrangement according to the present invention, the present invention provides, in a variant, for a means for blowing fluid, especially gas, into the region of the filter unit on the clean gas side and for a means for closing off the region of the filter unit on the clean space side against an outlet and a lance protruding in the region of the filter unit on the clean space side for spraying cleaning liquid into this region of the filter unit as well as a cleaning lance protruding into the exterior space of the at least one filter unit, which said exterior space faces away from the clean side, especially into a filter dome surrounding this filter unit for cleaning the sides of the filter unit exposed to the gas contaminated with particles by means of a liquid.

Provisions are made in a variant of the process according to the present invention for the gap in the lower region between the exterior filter and the interior filter of the at least one filter unit to be opened by lowering or raising the interior filter in relation to the exterior filter and to be closed by an opposite motion. Cleaning steps can be provided within the framework of the process according to the present invention such that cleaning gas is blown into the filter unit preferably in advance, while a gas outlet is closed, from the region of the filter unit on the clean space side and through the filters of said filter unit against the direction of flow during the cleaning operation of said filter unit; that regions of the filter facing away from the clean gas space are cleaned by means of a cleaning liquid ejected from a cleaning lance, and that, as was already stated, drying of the at least one filter unit is performed while opening the gap between the exterior filter and the interior filter. For cleaning by mans of ultrasound, the present invention makes provisions, prior to the drying, for metal filters of the filter unit to be cleaned by introducing a coupling liquid into the intermediate space between the exterior filter and the interior filter with the gap between the two filters closed by means of an ultrasound source protruding into the intermediate space.

Other advantages and features of the present invention appear from the claims and from the following description, in which exemplary embodiments of the present invention are explained in detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
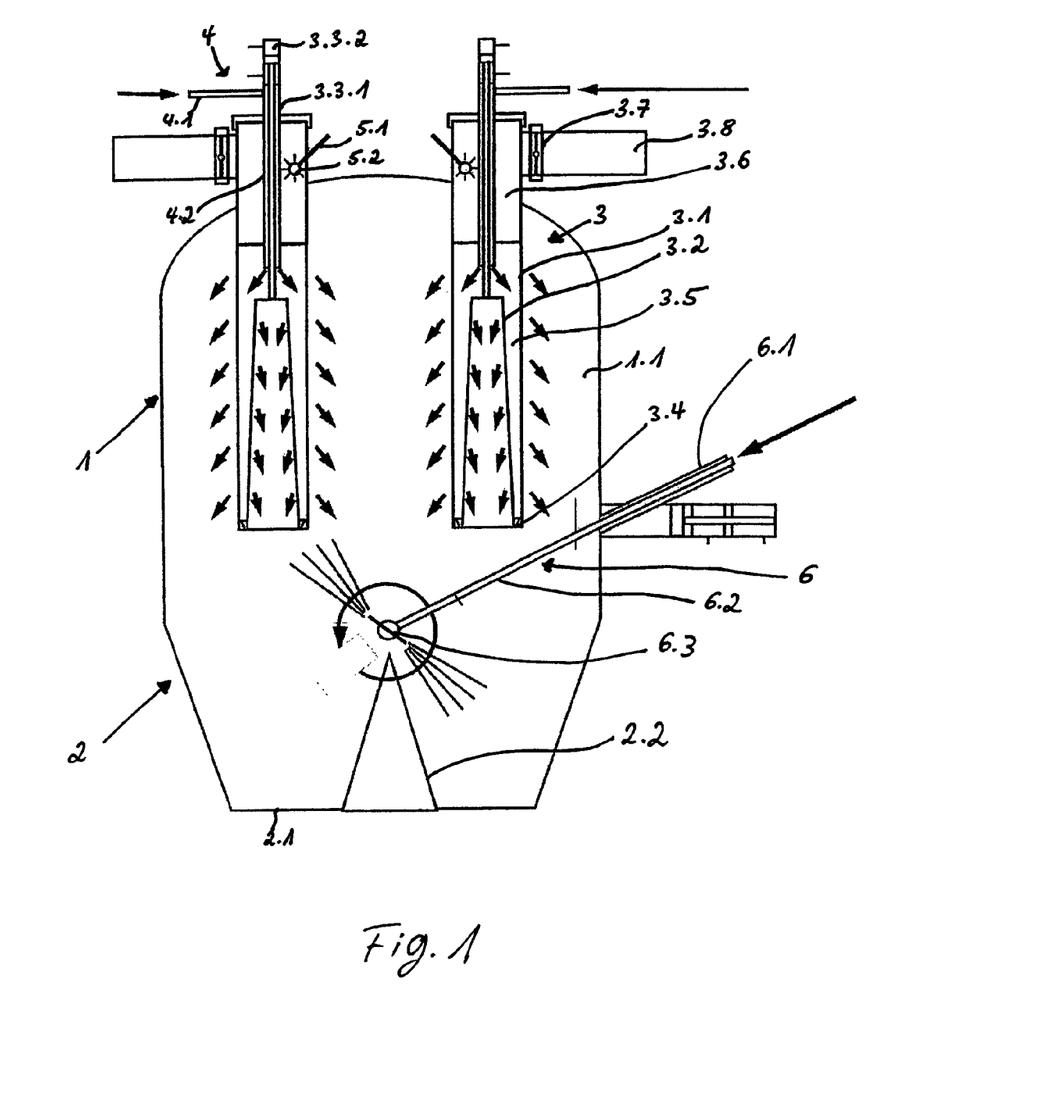
FIG. 1 is a schematic vertical longitudinal section through a filter arrangement according to the present invention on a process container.

Referring to the drawings in particular, FIG. 1 shows the filter arrangement 1 according to the present invention arranged on a process container 2 tapering conically from top to bottom. For example, particulate matter is treated in such a process container 2, e.g., by mixing, drying, granulating, pelletizing and/or coating the product. Thus, product particles having the fineness of dust can be agglomerated and thus granulated in the process container into larger particles, or else particulate starting product can be provided with a coat by coating. A bottom 2.1, which is permeable to air and has passages, especially in the form of slots, is usually provided for this in the lower region of the process container 2. Nozzles, which make it possible to spray on a coating medium, may be arranged integrated in said bottom or in the cylindrical wall.

The filter arrangement 1 according to the present invention has a plurality of, usually three to six, filter units 3 in a housing-like filter dome 1.1. Such a filter unit 3 has an exterior filter 3.1 and an interior filter 3.2, wherein said exterior filter 3.1 is usually cylindrical and is cylindrical in the exemplary embodiment being shown, whereas said interior filter 3.2 is usually conical and is conical, namely, tapering from top to bottom, in the exemplary embodiment being shown.

In the process operation, i.e., when the filter units 3 clean or remove dust from air contaminated with dust or from a gas contaminated with dust, which air is present in the process container 2 and in the filter dome 1.1, the lower edges of the exterior filter 3.1 and interior filter 3.2 are aligned with one another and are connected to one another via a closed annular area 3.4, as this corresponds to the state of the art. The top side of the interior filter 3.2 ends below the top end of the exterior filter 3.1. The filter area is markedly enlarged, nearly doubled, by the filter unit 3 designed in such a way as a double filter with an exterior filter 3.1 and an interior filter 3.2 compared to a, for example, cylindrical single filter.

The ring jacket-like intermediate space 3.5 between the exterior filter and interior filter 3.1, 3.2, into which the clean air flows through the filters, is in connection with an outlet region 3.6 for the clean air above the interior filter 3.2, which [region] is in turn in fluid connection with a exhaust air tube 3.8 via a flap 3.7, which is to be opened.

Figure 6:
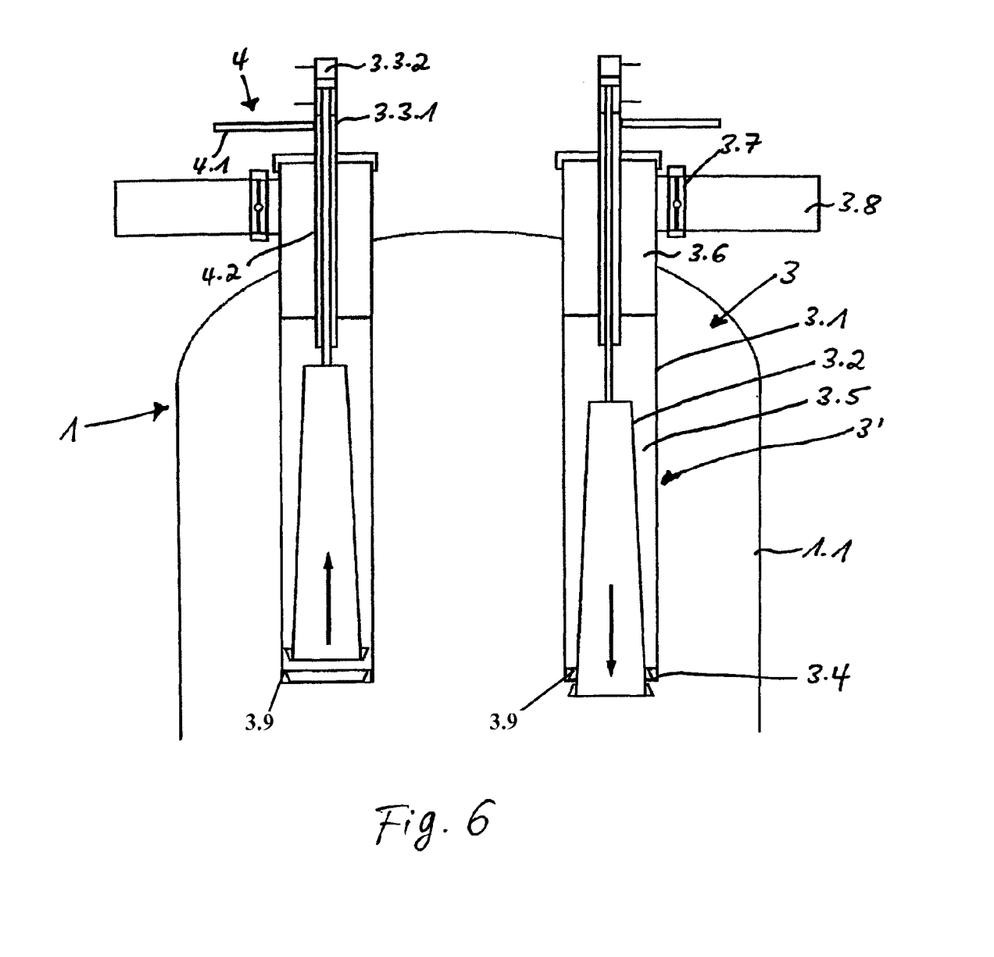
FIG. 6 is alternative embodiments of the relative mobility of the interior and exterior filters of the filter units.
Figure 7:
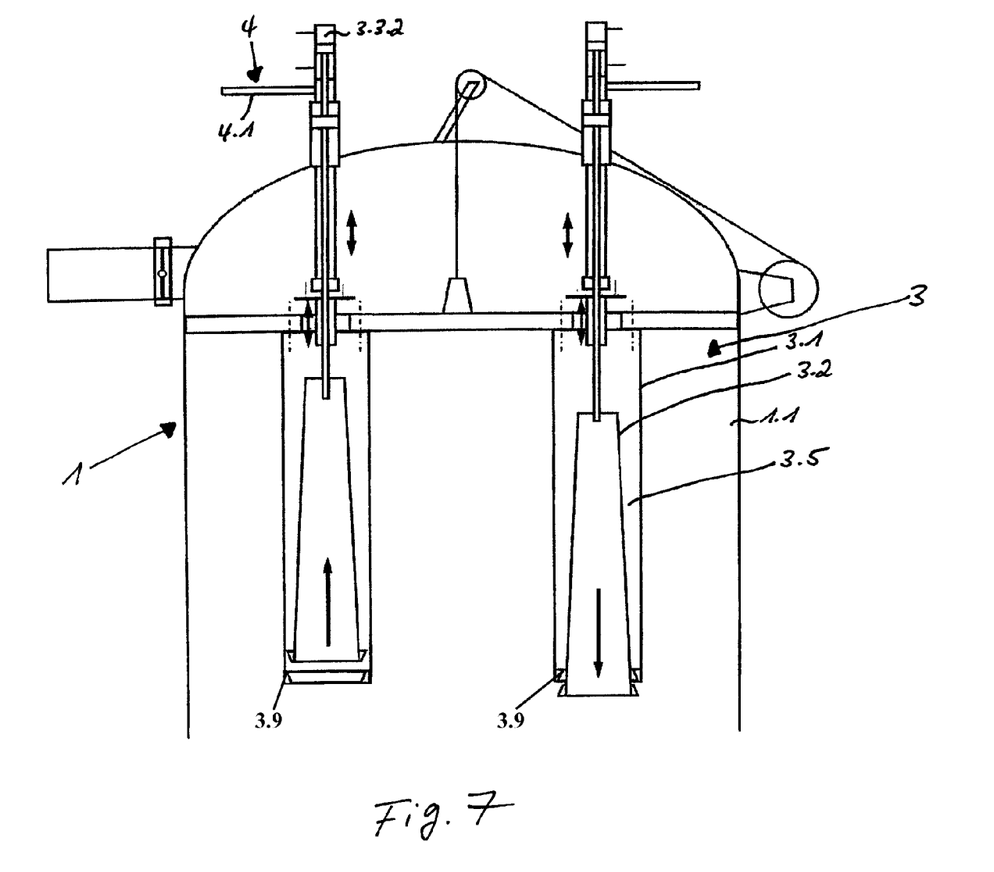
FIG. 7 is alternative embodiments of the relative mobility of the interior and exterior filters of the filter units with a lowerable intermediate bottom.

The interior filter 3.2 is connected via an actuating rod 3.3.1 to a drive 3.3.2, by which the interior filter 3.1 can be lowered in the exemplary embodiment shown in FIG. 1 or—in the exemplary embodiment to the left in FIGS. 6 and 7—also raised, as a result of which an annular gap 3.9 is opened to the intermediate space 3.5 between the exterior and interior filters 3.1, 3.2 between the lower regions of the exterior and interior filters 3.1, 3.2. The drive may be, for example, a hydraulic or pneumatic drive with a piston-and-cylinder arrangement or also an electric drive, be it an electric motor drive or an electromagnetic drive.

Furthermore, a cleaning device 4 is provided, which has a fluid feed line 4.1 and a lance 4.2, which protrudes into the outlet region 3.6 and cylindrically surrounds the drive rod 3.3.1 in the exemplary embodiment being shown and has a discharge opening at its top end, at a vertically spaced location from the top side of the interior filter 3.2. The clean air side of the filters can be cleaned hereby as this will be described below.

A cleaning lance 5.1 with an outlet 5.2 for a cleaning fluid protrudes into the exhaust air space 3.6 for the process gas.

Finally, a straight jet nozzle cleaner 6 with a liquid feed 6.1, with a lance 6.2 protruding approximately centrally into the filter dome 1.1 and with a discharge nozzle 6.3 arranged at the end of lance 6.2 is located in the lower region of the filter dome 1.1. As will be described below, cleaning of the outside of the filters 3.2, 3.3 can be carried out hereby.

Figure 4:
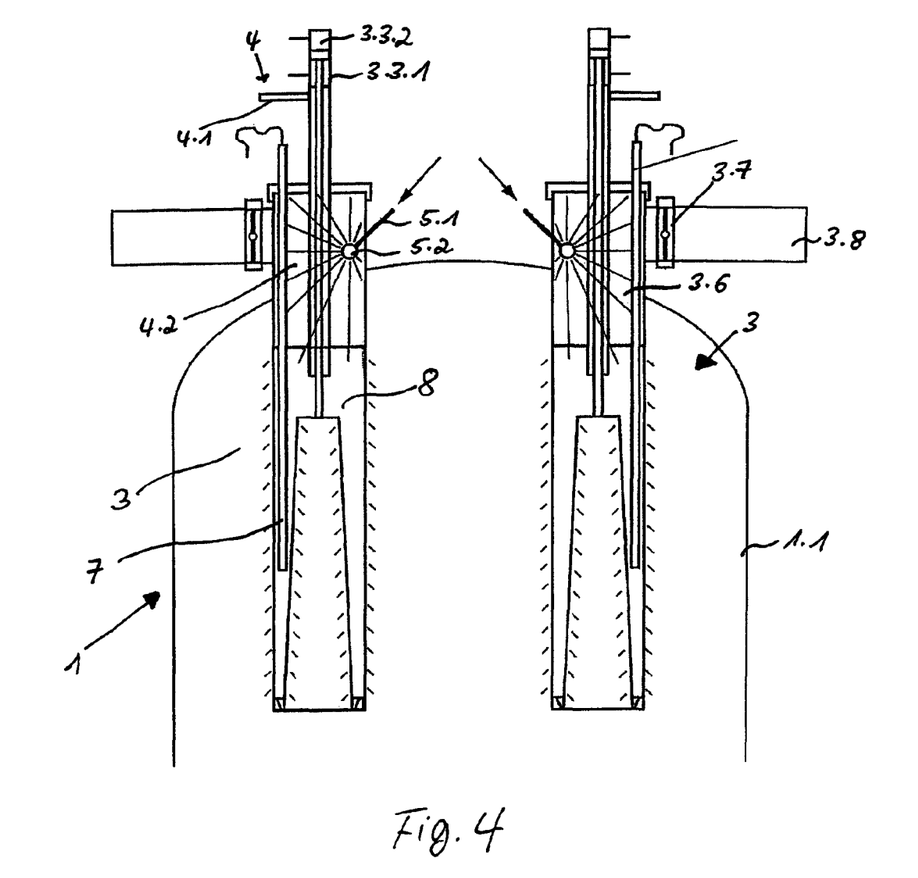
FIG. 4 is a filter arrangement, which is additionally provided with an ultrasound source for ultrasonic cleaning in case of metal filters.

The filters are metal filters in the embodiment according to FIG. 4, i.e., they are screen-covered. The present invention provides for an ultrasound transducer 7 protruding into the intermediate space of each filter unit 3 between the exterior and interior filters 3.1, 3.2 for additional cleaning in this case. A liquid, such as a CIP liquid 8, is filled in as a coupling medium between the ultrasound transducer 7 and the filters 3.1, 3.2.

Figure 5:
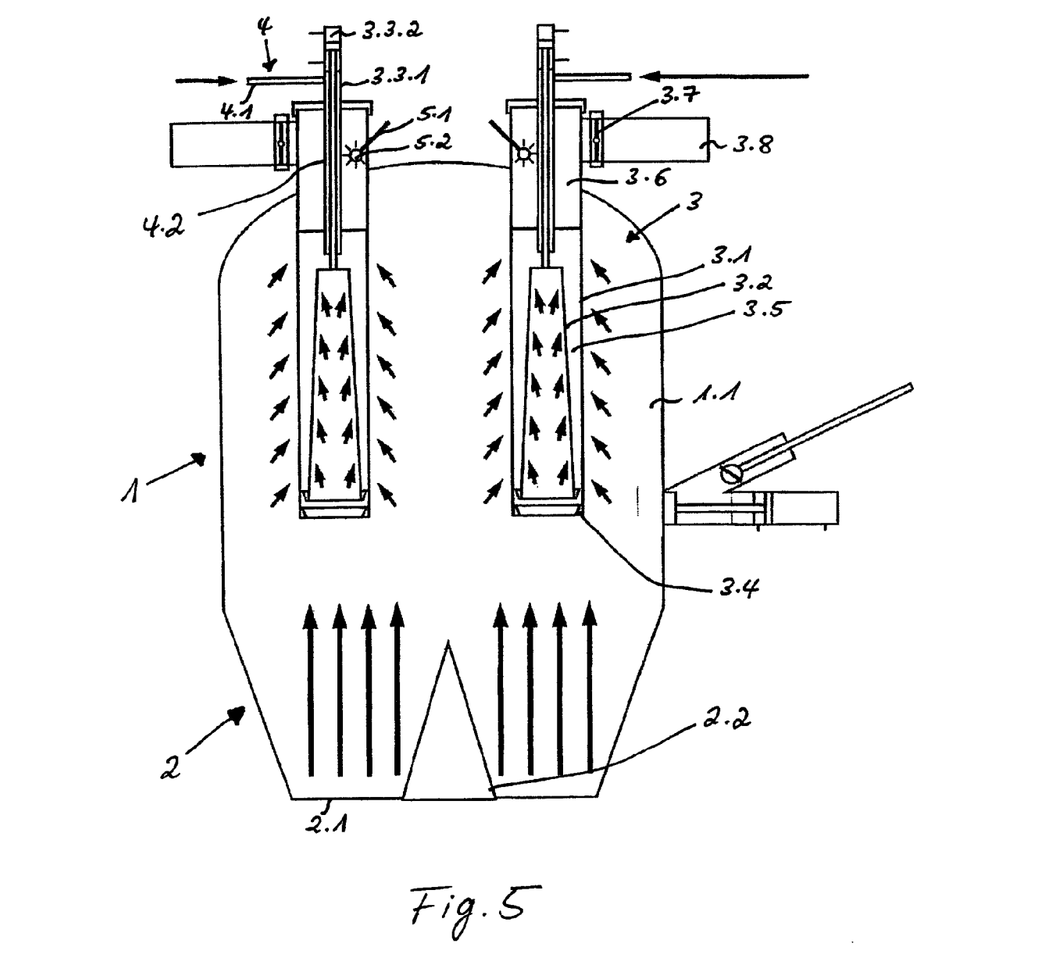
FIG. 5 is a view of the filter arrangement according to the present invention to illustrate the drying operation of the filters.

FIG. 5 shows that dry air is blown in the space between the interior of the filter dome 1.1 through the air-permeable bottom 2.1 to dry the filters 3.1, 3.2, especially if they are fabric filters, but also in case of metal filters with the process space emptied.

Figure 2:
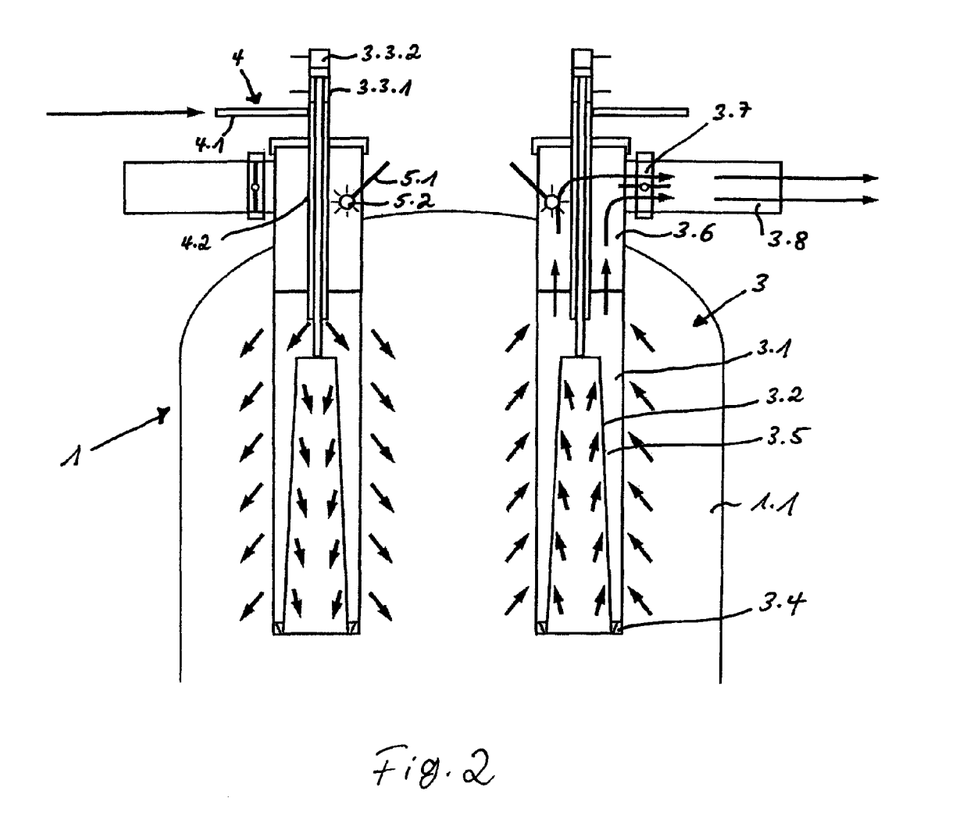
FIG. 2 is a longitudinal section through the top side of a filter dome with two filter units, of which the one on the right-hand side filters process air, while the one on the left-hand side is switched for cleaning the filters.

The process for cleaning the filter unit equipped in this manner according to the present invention takes place as follows:

During the operation process, during which particulate product is being treated in the process container 2 in the above-described manner by blowing in air or gas through the air-permeable bottom 2.1, this gas enters the interior of the filter unit 3, as this can be seen especially in the filter unit 3 on the right-hand side in FIG. 2, from the outside through the exterior filter 3.1 and from the inside through the interior filter 3.2 and is cleaned in the process by the filters 3.1, 3.2. It flows through the outlet region 3.6 and escapes via the exhaust air tube 3.8 of the filter arrangement 1 with the flap 3.7 open, after which it can be returned via bottom 2.1.

If the filters 3.1, 3.2 are to be cleaned in place (CIP=cleaning in place), flap 3.7 in the exhaust gas duct 3.8 is closed for a first cleaning step and cleaning fluid, such as air or an inert gas is subsequently blown into the interior of filter unit 3 and hence through the filters 3.1, 3.2 from the clean gas side via the fluid feed line 4.1 and lance 4.2, as this is shown in FIG. 1 and on the left-hand side of FIG. 2, so that material adhering on the process side of these filters, such as granulating material, coating material or the like, is blown off from the filters.

The interior and exterior filters 3.1, 3.2 are now in a relative position, in which the annular gap 3.9 on their undersides is closed.

Figure 3:
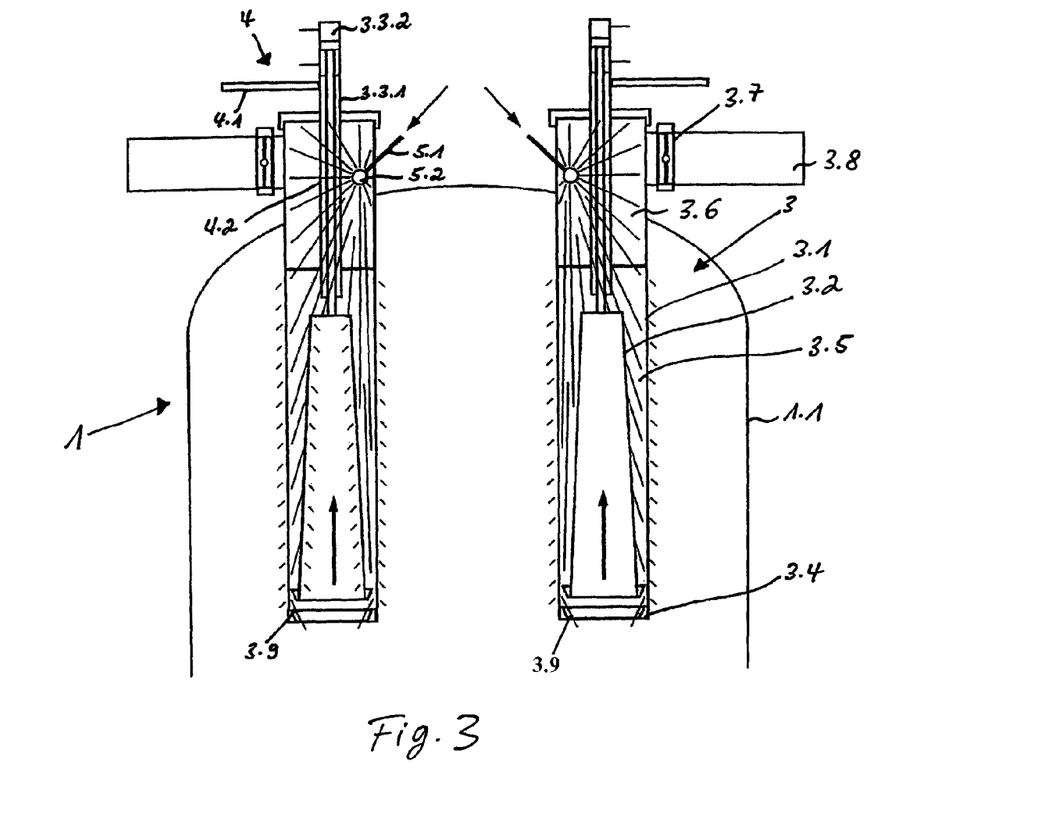
FIG. 3 is a longitudinal section through the filter arrangement according to the present invention with view of the clean gas side cleaning of the filters by means of cleaning liquid.

In a next step—in the embodiment according to FIG. 3—the interior filter 3.2 is raised by drive 3.3.2 by means of the actuating rod 3.3.1 in relation to the exterior filter 3.2 (FIG. 3), so that the annular gap 3.9 is opened. Cleaning liquid, so-called CIP liquid, is subsequently sprayed into the interior space of the exterior filter 3.1 and into the intermediate space between this and the interior filter 3.2 via the cleaning lance 5.1, so that material that may adhere on the inside of the exterior filter 3.1 and/or on the radially outer side of the interior filter 3.2 can be flushed out via the annular gap 3.9.

As was stated, an ultrasound transducer protruding into the intermediate space between the exterior and interior filters 3.1, 3.2 may be provided for further cleaning if the filters 3.1, 3.2 are metal filters. Liquid continues to be sprayed in this case into the interior space of the filter unit with the annular gap 3.9 closed, the quantity of such liquid sprayed exceeding the quantity that can flow off through the filters, as a result of which liquid 8 will collect in the interior space, and this liquid will act as a coupling medium for the ultrasound. The ultrasound transducer 7 is activated and effective removal of material adhering to the inside of the exterior filter 3.1 and to the outside of the interior filter 3.2, such as coating material or the like, takes place, and such material migrates into the liquid 8.

This liquid can then be drained off by raising—in the embodiment according to FIG. 3—the interior filter 3.2 relative to the exterior filter 3.1 by means of drive 3.3.2 and by mediation by the actuating rod 3.3.1.

In a next step, which is shown in FIG. 1, the outside of the exterior filter 3.1 and the inside of the interior filter 3.2 are cleaned by means of the straight-jet nozzle cleaner 6 by means of liquid (CIP liquid) fed via the liquid feed 6.1 thereof via said lance 6.2 thereof and said discharge nozzle 6.3.

Finally, drying of the entire interior space of the filter arrangement 1 and especially of the filter units 3 is carried out (FIG. 5) by dry air or dry gas fed via the slotted bottom 2.1.

FIG. 6 shows on the right-hand side an alternative embodiment of a filter unit according to the present invention for comparison with the filter unit that is embodied in the embodiment on the left-hand side of FIGS. 1 through 5 and is described in detail there.

Filter unit 3' on the right-hand side of FIG. 6 has fundamentally the same design as the filter unit 3 and has the same elements, which are provided with the same reference numbers. Only the interior filter 3.2 can be lowered rather than raised in relation to the exterior filter to generate the slot-like gap 3.9.

With the two alternatives of the interior filter 3.2 that can be raised or lifted off, FIG. 7 shows another alternative embodiment, in which a lowerable intermediate bottom is provided in the filter dome 1.1 above the filters 3 or exterior filters 3.1.

While specific embodiments of the invention have been described in detail to illustrate the application of the principles of the invention, it will be understood that the invention may be embodied otherwise without departing from such principles.

The invention claimed is:

1. A filter arrangement for cleaning gases contaminated with particles, the arrangement comprising:
   at least one filter unit with an exterior filter and an interior filter supported in a filter position with the interior filter in the exterior filter and with lower edges of the exterior filter and lower edges of the interior filter aligned with one another and connected and in contact via a closed area to define a clean space on one side of the connected interior filter and the exterior filter, said clean space being defined between the interior filter and the exterior filter, wherein contaminated gas is provided outside of the exterior filter and on an inner side of the interior filter;
   a means for delivering a cleaning fluid;
   a relative movement means for moving one of the exterior filter and the interior filter relative to the other of the exterior filter and the interior filter for disconnecting the contact at the closed area to provide a gap thereat, said gap being located at a lower region of said exterior filter and said interior filter, wherein the filter is cleaned by spraying the cleaning fluid while the gap is exposed in the lower region of the exterior filter and the interior filter.

2. A filter arrangement in accordance with claim 1, wherein the gap is an annular gap with the exterior and interior filters being movable relative to one another while exposing the annular gap.

3. A filter arrangement in accordance with claim 1, wherein the interior filter can be raised relative to the exterior filter.

4. A filter arrangement in accordance with claim 1, wherein the interior filter can be lowered relative to the exterior filter.

5. A filter arrangement in accordance with claim 1, wherein said means for relative movement comprises a drive provided outside the filter unit for generating relative motion between the exterior and interior filters.

6. A filter arrangement in accordance with claim 1, further comprising:
   a means for closing the region of the filter unit on the clean space side against an outlet.

7. A filter arrangement in accordance with claim 1, wherein said means for delivering a cleaning fluid comprises a liquid line leading into the region of the filter unit on the clean space side.

8. A filter arrangement in accordance with claim 7, wherein said means for delivering a cleaning fluid comprises a lance or spray head protruding into the region of the filter unit on the clean space side for spraying cleaning liquid into said region of the filter unit on the clean space side.

9. A filter arrangement in accordance with claim 1, further comprising: an ultrasound transducer protruding into an intermediate space between the exterior and interior filters for the ultrasonic cleaning of the filters.

10. A filter arrangement in accordance with claim 1, further comprising: a cleaning lance protruding into an exterior space of the at least one filter unit, which said exterior space faces away from the clean gas side, into a filter dome surrounding said filter unit, for cleaning the sides of the filter unit exposed to the gas contaminated with particles by means of a liquid.

11. A process comprising the steps of:
providing at least one filter unit having an exterior filter and an interior filter of a filter arrangement, said interior filter being located in said exterior filter, wherein lower edges of the exterior filter and lower edges of the interior filter are aligned with one another and connected and in contact via a closed area to define a clean space on one side of the connected interior filter and the exterior filter, said clean space being defined between the interior filter and the exterior filter, wherein contaminated gas is provided outside of the exterior filter and on an inner side of the interior filter;
providing a means for delivering a cleaning fluid;
providing a relative movement means;
cleaning at least a portion of the cleaning space of the filter unit on a clean gas side;
exposing the gap in the lower region of the exterior filter and the interior filter via said relative movement means, wherein the filter is cleaned by spraying the cleaning fluid while the gap is exposed in the lower region of the exterior filter and the interior filter.

12. A process in accordance with claim 11, wherein cleaning gas is blown into the filter unit and against the direction of flow in advance, while closing a gas outlet from the region of the filter unit on the clean space side during the cleaning operation of said filter unit through the filters of said filter unit.

13. A process in accordance with claim 11, wherein metal filters of the filter unit are cleaned by means of an ultrasound lance protruding into the intermediate space while introducing a coupling liquid into the intermediate space between the exterior and interior filters with the gap between the two filters closed.

14. A process in accordance with claim 11, wherein regions of the filter facing away from the clean gas space are cleaned by means of the cleaning liquid ejected from a cleaning lance, said means for delivering the cleaning fluid comprising said cleaning lance.

15. A process in accordance with claim 11, wherein drying of the at least one filter unit is carried out while opening the gap between the exterior and interior filters.

16. A process in accordance with claim 11, wherein the gap in the lower region between the external and internal filters of the at least one filter unit is opened by lowering or raising the interior filter in relation to the exterior filter and closed by an opposite motion.

17. A filter arrangement in accordance with claim 3, wherein the gap is an annular gap with the exterior and interior filters being moved relative to one another to form said annular gap.

18. A filter arrangement in accordance with claim 4, wherein said relative movement means comprises a drive outside the filter unit for generating relative motion between the exterior filter and the interior filter.

19. A filter arrangement in accordance with claim 1, further comprising:
a means for blowing in gas into a region of the filter unit from said clean space side;
a means for closing the region of said filter unit on said clean space side against an outlet; and
a liquid line leading into a region of the filter unit on said clean space side.

* * * * *